(12) United States Patent
Roberge

(10) Patent No.: US 10,827,684 B2
(45) Date of Patent: Nov. 10, 2020

(54) MOBILE AGRICULTURAL WRAPPING SYSTEM AND METHOD

(71) Applicant: CNH Industrial Canada, LTD., Saskatoon (CA)

(72) Inventor: Martin J. Roberge, Saskatoon (CA)

(*) Notice: Subject to any disclaimer, the term of this patent is extended or adjusted under 35 U.S.C. 154(b) by 226 days.

(21) Appl. No.: 14/316,121

(22) Filed: Jun. 26, 2014

(65) Prior Publication Data
US 2015/0373914 A1  Dec. 31, 2015

(51) Int. Cl.
*A01F 15/07* (2006.01)
*A01F 15/08* (2006.01)

(52) U.S. Cl.
CPC ........ *A01F 15/071* (2013.01); *A01F 15/0715* (2013.01); *A01F 15/08* (2013.01)

(58) Field of Classification Search
CPC ............ A01F 15/0715; A01F 2015/072; A01F 2015/076; A01F 2015/0725; A01F 2015/186; B65B 41/12; B65B 59/04
USPC .......... 53/116–118, 176, 587, 588, 210, 211, 53/399, 397, 389.2–389.4, 393; 248/616, 248/657, 429, 430, 432; 242/599.1; 74/16; 56/341
See application file for complete search history.

(56) References Cited

U.S. PATENT DOCUMENTS

| | | | | |
|---|---|---|---|---|
| 3,641,754 A | * | 2/1972 | Anstee | A01D 90/00 56/12.7 |
| 4,173,112 A | * | 11/1979 | Meiners | A01F 15/071 53/118 |
| 4,243,143 A | * | 1/1981 | Muller | B65B 11/105 206/429 |
| 4,387,548 A | * | 6/1983 | Lancaster | A01F 15/071 53/399 |
| 4,520,612 A | * | 6/1985 | Muller | B65B 21/24 53/201 |
| 4,691,503 A | | 9/1987 | Frerich | |
| 4,697,402 A | * | 10/1987 | Anstey | A01F 15/0715 53/506 |
| 5,189,866 A | * | 3/1993 | Krutza | A01F 15/071 53/211 |
| 5,561,971 A | * | 10/1996 | Sampson | A01F 15/071 53/390 |
| 5,979,141 A | | 11/1999 | Phillips | |
| 5,996,307 A | | 12/1999 | Niemberg et al. | |
| 6,021,622 A | * | 2/2000 | Underhill | A01F 15/0715 53/118 |
| 6,247,291 B1 | | 6/2001 | Underhill | |

(Continued)

FOREIGN PATENT DOCUMENTS

DE  102004027307 A1  12/2005
DE  102006049139 A1  4/2008

*Primary Examiner* — Dariush Seif
(74) *Attorney, Agent, or Firm* — Patrick Sheldrake; Peter Zacharias

(57) ABSTRACT

The present disclosure relates to a harvester and a wrapping system for bales of material, often for the baling of agricultural crop. The harvester and wrapping system comprise a first and a second subframe, a panel, and a wrapping assembly that is capable of moving from an internal position to an external position relative to the harvester. The present disclosure relates to a harvester and a wrapping system that facilitates maintenance of the wrapping assembly and the loading and unloading of wrapping material while the wrapping assembly is in the external position relative to the harvester.

18 Claims, 9 Drawing Sheets

(56) References Cited

U.S. PATENT DOCUMENTS

| | | | |
|---|---|---|---|
| 6,272,816 B1* | 8/2001 | Viaud | A01F 15/0715 242/441.4 |
| 6,324,820 B1* | 12/2001 | Gelfman | B65B 11/04 53/204 |
| 6,722,110 B1* | 4/2004 | Royneberg | A01F 15/071 100/15 |
| 7,322,167 B2 | 1/2008 | Chapon et al. | |
| 7,401,445 B2* | 7/2008 | Bausch | B65B 59/04 53/281 |
| 7,430,959 B2 | 10/2008 | Routledge | |
| 8,607,538 B2* | 12/2013 | Cere | B65B 11/025 53/389.1 |
| 8,925,287 B2* | 1/2015 | Derscheid | A01F 15/0715 53/168 |
| 9,010,071 B2 | 4/2015 | Claeys et al. | |
| 2003/0226334 A1* | 12/2003 | McClure | A01F 15/141 53/176 |
| 2004/0083905 A1* | 5/2004 | Viaud | A01F 15/071 100/8 |
| 2004/0089167 A1* | 5/2004 | Viaud | A01F 15/071 100/88 |
| 2004/0159074 A1* | 8/2004 | McClure | A01F 15/0715 53/389.2 |
| 2005/0193687 A1* | 9/2005 | Tosa | B65B 11/025 53/399 |
| 2006/0125259 A1* | 6/2006 | Allegretti | B65B 11/00 294/94 |
| 2007/0074488 A1* | 4/2007 | Smith | A01F 15/0715 53/430 |
| 2008/0098692 A1* | 5/2008 | Paillet | A01F 15/0715 53/211 |
| 2008/0229707 A1* | 9/2008 | Zitella | B65B 11/025 53/64 |
| 2009/0272072 A1* | 11/2009 | Paillet | A01F 15/0715 53/118 |
| 2009/0282788 A1* | 11/2009 | McClure | A01F 15/0715 53/587 |
| 2010/0024357 A1* | 2/2010 | Viaud | A01F 15/071 53/116 |
| 2010/0058712 A1* | 3/2010 | Prataiola | B65B 25/14 53/235 |
| 2010/0089013 A1* | 4/2010 | McClure | A01F 15/0715 53/587 |
| 2010/0236191 A1* | 9/2010 | Paillet | A01F 15/0715 53/210 |
| 2012/0272837 A1* | 11/2012 | Smith | A01F 15/0715 100/34 |
| 2012/0289388 A1* | 11/2012 | Ehrmann | B29C 33/30 483/1 |
| 2013/0125518 A1* | 5/2013 | Smith | A01F 15/0715 53/582 |
| 2013/0146552 A1* | 6/2013 | Grimes | A47B 88/48 211/126.15 |
| 2013/0167489 A1* | 7/2013 | Brizzi | B65B 13/04 53/582 |
| 2013/0324199 A1* | 12/2013 | Roberge | A01D 41/1243 460/111 |

\* cited by examiner

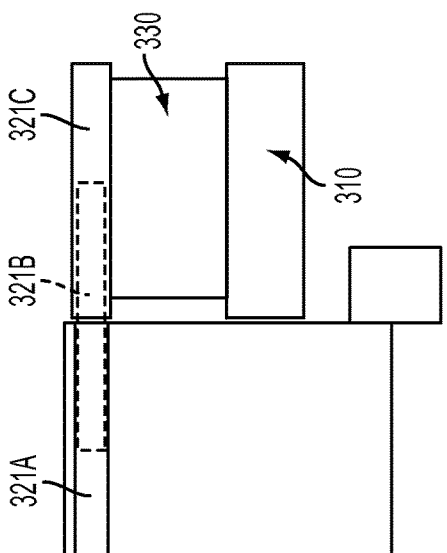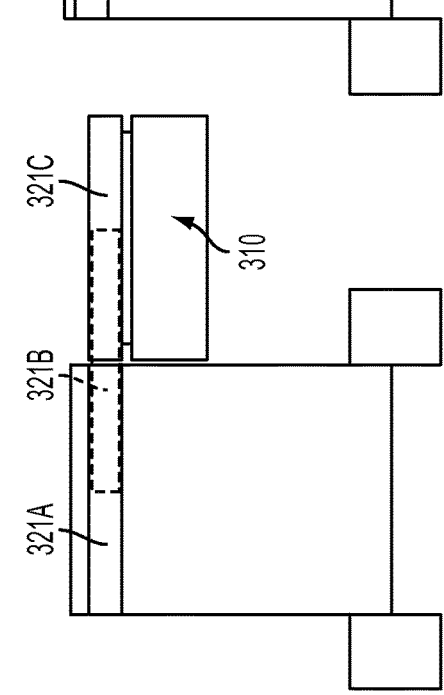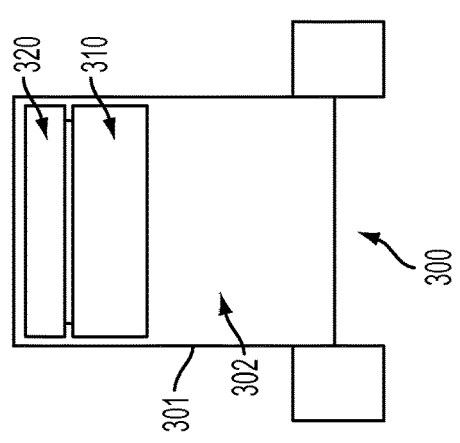

MOBILE AGRICULTURAL WRAPPING SYSTEM AND METHOD

TECHNOLOGY FIELD

The present disclosure relates to a harvester and a wrapping system for bales of material, often for the baling of agricultural crop, where the wrapping system facilitates the loading and unloading of wrapping material while in the external position relative to the harvester.

BACKGROUND

For many years harvesters have been used to consolidate and package crop material so as to facilitate the storage and handling of the crop material for later use. A mower-conditioner typically cuts and conditions the crop material for windrow drying in the sun. When the cut crop material is properly dried, an agricultural harvester, such as a round baler or a continuous round baler with a central net wrapping system, operates over the windrows to pick up the crop material and form the crop material into cylindrically-shaped round bales. Other agricultural harvesters, such as those harvesters used for biomass collection, use direct feed mechanisms that cut, collect, and bale material into a round bale in sequential steps.

When the bale has achieved a desired size and density, a wrapping system may wrap the bale in wrapping material to ensure that the bale maintains its shape and density. A cutting or severing mechanism may then be used to cut the wrapping material once wrapping is completed. The wrapped bale may then be ejected from the baler and the process may begin again with a new bale. As wrapping material is used, it becomes necessary to place new wrapping material in the wrapping system. At a weight that can be over 80 pounds (36 kilograms), replacing wrapping material can be a significant challenge. Additionally, access to the wrapping system for proper feeding of the wrapping material and maintenance is desirable.

Conventional harvesters and wrapping systems require the wrapping material to be loaded by hand, reducing the efficiency of the bailing process and requiring great physical effort. Reference is made, for example, to U.S. Pat. Nos. 5,687,548, 6,536,337, 6,651,408, and 8,490,366 that illustrate such wrapping systems, the disclosures of which are incorporated herein by reference in their entirety. Modified harvester and wrapping systems have been designed to allow easier replacement of the wrapping material. U.S. Pat. No. 5,996,307 discloses a loading mechanism for the wrapping material, in which rolls of wrapping material are stored in a cylindrical container that is attached to the side of the harvester. This cylindrical container can pivot such that a roll of wrapping material can be brought to a loading position higher up on the harvester. The roll is pushed through the container into an operable position inside the harvester, and the cylindrical container can be lowered. With this system, an operator must still perform labor intensive tasks, such as loading the cylindrical container, and lifting it to the loading position. U.S. Pat. No. 7,322,167 discloses another modified loading mechanism for the wrapping material, in which a roll of wrapping material is deposited on a carrier in the upper section of a harvester. The carrier is moved by an actuator such that the roll of wrapping material is brought to an operating position inside the harvester. This system does eliminate most of the manual labor required to bring a roll of wrapping material to an operable position, however, an operator must still maneuver a roll of wrapping material to the carrier, which is positioned high up on the harvester.

SUMMARY

The disclosure relates to a harvester comprising a first subframe, a second subframe, and a panel; whereby the first and second subframe define a compartment within the harvester at a first operable position; wherein the panel covers at least one interior portion of the compartment; wherein the first and second subframes are operably connected such that at least one of the first or second subframes is movable to at least a second operable position that facilitates access to at least the one interior portion of the compartment through the panel from a point exterior to the compartment.

In some embodiments, the harvester further comprises: a frame positioned around at least a first pair of side walls that define at least a first bale chamber; and a net wrapping mechanism positioned in the compartment; wherein the first and second subframes are operably connected by at least one or a plurality of rolls that allow movement of the first and/or second subframe from the first operable position to the second operable position; wherein the second operable position is exterior to the frame; and wherein the panel facilitates access to the net wrapping device from a point exterior to the frame.

In some embodiments, the first and second subframes are operably connected by at least one or a plurality of rolls configured for adjustment of the first and/or second subframes from the first to at least the second operable position by a sliding movement of the first and/or second subframe. In some embodiments, at least one area defined by at least an interior portion of the first subframe comprises at least one area defined by at least an interior portion of the second subframe in the first operable position; and at least one area of the interior of the second subframe is positioned external to the first subframe in the second operable position.

In some embodiments, the harvester further comprises at least a first bale chamber and a net wrapping mechanism positioned within the compartment in a first operable position and configured such that, in the at least second operable position, the net wrap mechanism is accessible through the panel from a point exterior to the compartment.

In some embodiments, the at least one area of the first subframe is at least partially cylindrical and is positioned around the at least one interior portion of the second subframe in the first operable position. In some embodiments, the at least one area of the first subframe is at least partially rectangular and is positioned around the at least one interior portion of the second subframe in the first operable position.

In some embodiments, the harvester further comprises a net wrapping mechanism positioned in at least one interior area of the compartment in the first operable condition, and wherein the net wrapping mechanism comprises: at least a first and a second feed rollers; a feed plate; a first and a second compression rollers; a cutting knife; and at least a first actuator; wherein a wrapping material can be passed around the at least two feed rollers and through the feed plate during wrapping.

In some embodiments, the harvester further comprises a frame; wherein the at least one of the first or second subframes moves at least laterally or substantially laterally in relation to lengthwise orientation of the harvester in transition from the first to the second operable conditions;

wherein the at least one of the first or second subframes moves exterior to the frame in the second operable condition.

In some embodiments, the harvester further comprises a frame; wherein the at least one of the first or second subframes moves at least vertically or substantially vertically in transition from the first to the second operable conditions; and wherein the at least one of the first or second subframes moves exterior to the frame in the second operable condition.

In some embodiments, the first and/or second subframes are adjustable in one or a plurality of positions along a horizontal and/or vertical axis. In some embodiments, a net wrapping mechanism is configured such that, in the at least a first operable position, the net wrap mechanism is capable of dispensing wrap material in at least one bale chamber; wherein the net wrap mechanism is movable relative to its position in the first operable position and wherein the net wrap mechanism is optionally operably connected to the at least one roll or series of rolls a bale chamber.

The present disclosure also provides a net wrap assembly comprising a net wrap device, wrap material, a feed plate, a cutting knife, and at least a first subframe; wherein the at least first subframe defines a compartment capable of movement in at least a first and a second operable position; wherein the net wrap device is positioned within the compartment in at least the first operable position; and, in the at least a first operable position, the net wrap device is adapted for dispensing net wrap material into a bale chamber of a harvester; and, in the at least second operable position, the net wrap device is adapted for accessibility in the harvester from a point exterior to the first subframe.

In some embodiments, the net wrap assembly further comprises: at least a first and second feed roller; at least a first and a second compression roller; and at least one first actuator; wherein the at least a first and a second feed rollers transfer wrapping material from the net wrap device to the feed plate.

In some embodiments, the net wrap assembly further comprises a second subframe operably connected to the first subframe; wherein the first and second subframes define at least a first compartment in the first operable condition and are configured for movement between the first operable position in the interior of a harvester and the second operable position on the exterior of the harvester. In some embodiments, the net wrap device is movable within the compartment in the first operable condition.

In some embodiments, the net wrap assembly further comprises a panel positioned over an opening to the compartment, wherein the net wrap assembly is adapted for use within the interior of a harvester and capable of movement from the first operable position to the at least second operable position by a sliding movement of the compartment from the interior of the harvester to the exterior of the harvester and wherein the panel provides access to the compartment from a point exterior to the harvester such that net wrapping material can be operably mounted on the net wrapping device from the point exterior to the harvester.

In some embodiments, the net wrap assembly further comprises a panel; whereby the first and second subframe define a compartment within the harvester at a first operable position; wherein the panel covers at least one opening to an interior portion of the compartment; wherein the first and second subframes are operably connected by at least one or a plurality of rolls that allow movement of the first and/or second subframe from the first operable position to the second operable position; and wherein the position of the panel in the second operable condition facilitates access to the net wrap device from a point exterior to the compartment.

In some embodiments, the net wrap assembly further comprises a controller operably connected the net wrap assembly by at least one or a combination of: a manual lever, an electrical component, and a hydraulic actuator; wherein the controller is capable of adjusting the position of the one or plurality of subframe upon activation, wherein the controller is optionally connected to a sensor that prevents the movement of the net wrapping assembly while the harvester is actively operating. In some embodiments, the controller is optionally connected to a sensor that prevents the starting of the harvester while the net wrap assembly is still in a loading position.

The present disclosure also provides a method of replacing net wrap material in a harvester comprising a net wrap assembly, the method comprising: (a) adjusting the position of a compartment defined by sides of at least a first subframe said compartment comprising the net wrap assembly, wherein the step of adjusting the position of the compartment comprises manually moving or electronically initiating a command that moves at least a portion of the compartment from a first position in the interior of the harvester to a second position exterior to the harvester; wherein the second position of the compartment a panel is positioned to facilitate access to the net wrap assembly from a point exterior to the harvester. In some embodiments, the method further comprises a step of removing a used net wrap roll from the net wrap assembly after step (a); and optionally replacing the used net wrap roll with a second net wrap roll.

BRIEF DESCRIPTION OF THE DRAWINGS

FIGS. 3A, 3B, and 3C depict a harvester, with a first and a second subframe, in various operational positions.

DETAILED DESCRIPTION

Figure 1:
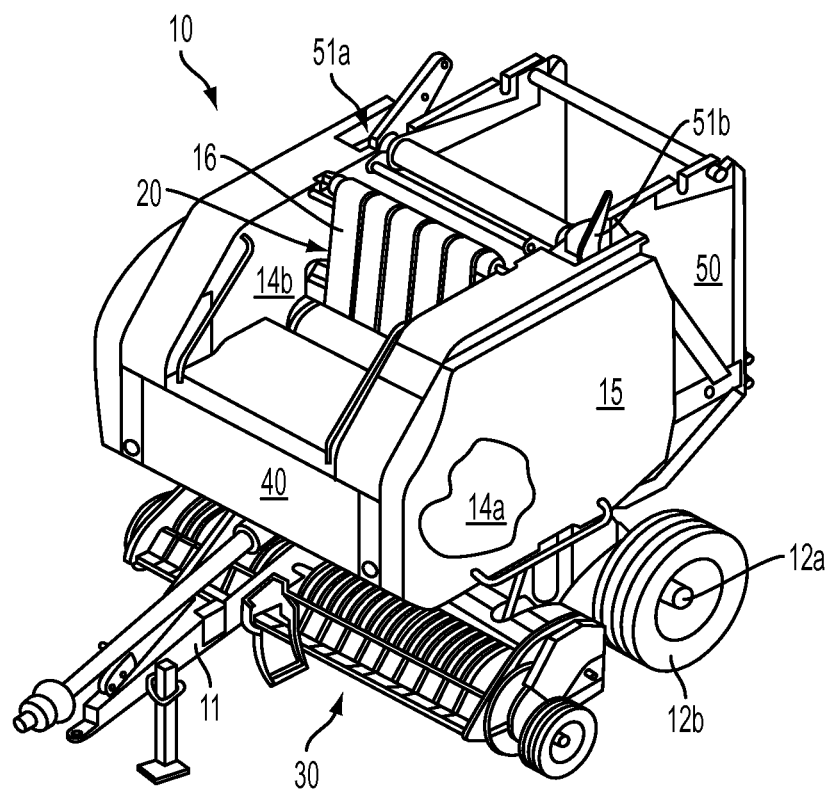
FIG. 1 depicts a static image of a traditional fixed chamber round baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "harvester" as used herein is defined as a machine designed to consolidate and package material so as to facilitate the storage and handling of the material for later use. In some embodiments, the harvester is used to harvest agricultural material. In some embodiments, the harvester is known as an agricultural baler, a waste baler, or a combine.

The term "material" as used herein is defined as a numerous individual items that are harvested or collected by the harvester. In some embodiments, the material is agricultural crop, such as hay or cotton. In some embodiments, the material is biomass such as agricultural or forestry biomass.

The term "bale chamber" as used herein is defined as any space within the harvester that forms a bale of harvested material. In some embodiments, the sides of the bale chamber are defined by opposite side walls and the bottom of the bale chamber is defined by at least one floor roller that spans transverse to the sidewalls and that partially supports the weight of the bale in the bale chamber. In some embodiments, the bale chamber is also defined in its front region by an entry point through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale.

In some embodiments, the harvester or system comprises one or a plurality of bale carriers with at least two pairs of arms that pivot upward and downwards with at least two different pivot points. In some embodiments, the two pivot points rest on two different axes of rotation. If embodiments comprise bale carriers with at least two pairs of arms, in some embodiments, the length of one pair of arms is shorter than the other, and in such cases, upon opening or closing of the bale carrier, the rate of speed of one pair of arms must be faster than the rate of speed of the other pair of arms, such that the shorter pair of arms does not interfere with the radial path of the longer pair of arms. If embodiments comprise bale carriers with at least two pairs of arms, in some embodiments, the length of one pair of arms is shorter than the other, and in such cases, upon opening or closing of the bale carrier, the rate of speed of one pair of arms must be faster than the rate of speed of the other pair of arms, such that no cross-over of the first or second pair of arms occurs upon movement of the bale carrier along its radial path.

In some embodiments, the harvester comprises at least one, two, or three bale carriers, wherein the at least the first, second, or third bale carriers comprises an arm assembly comprising at least one pair of arms with a length that defines a radial path about a pivot point around an axis of rotation of such bale carrier. In some embodiments, the arm assembly of such bale carriers comprise a linkage to one or more pivot points on the sidewall of the harvester or system such that the arm assembly rotates about the pivot point. In some embodiments, the harvester or system comprises at least two arm assemblies with linkages to two different pivot points around which the bale carriers rotatably pivot. As disclosed herein, if the bale carrier comprises at least two arm assemblies with at least two pivot points, the arm assemblies may be two different lengths. Upon initiating movement or any opening or closing disclosed herein, the shorter length of one arm assembly will move faster than the longer arm assembly such that the two arm assemblies do not cross radial paths as the bale carrier moves from one position to another position.

The term "net wrapping mechanism" as used herein is defined as a mechanical device or assembly that uses net wrapping material to wrap a formed bale. In some embodiments, the net wrapping mechanism comprises at least one feed roller, a feed plate, at least one compression roller, a cutting knife, and at least one actuator; wherein wrapping material is passed around the at least one feed roller through the feed plate. In some embodiments, the net wrapping mechanism is positioned with a movable subframe. In some embodiments, the net wrapping mechanism is optionally positioned on the interior or the exterior of a harvester.

The term "subframe" as used herein is defined a movable group of mechanical elements that is capable of expanding and contracting in at least one direction. In some embodiments, at least a first subframe is operably connected to the net wrapping mechanism. In some embodiments, at least a first second subframe consists of: movable units, rollers, telescopic tubes, and/or actuators. In some embodiments, at least a first subframe is capable of expanding and contracting in a sliding motion. In some embodiments, at least a first subframe is operably connected to a controller.

The term "wrapping material" as used herein is defined as a net, mesh, twine, plastic film, or other material that is used for the wrapping of a bale in order to maintain the shape and density of said bale and optionally protect it from weather or other external conditions.

The term "controller" as used herein is defined as a device that is operably connected to and commands another item, element, device, mechanism, or assembly and optionally provides information on the position, condition, or state of the commanded item, element, device, mechanism or assembly. In some embodiments, the controller is operably connected to a net wrapping mechanism. In some embodiments, the controller is operably connected to a net wrapping mechanism by at least one or a combination of a manual lever, and electrical component, and a hydraulic actuator. In some embodiments, the controller is able to control the position of the net wrapping mechanism. In some embodiments, the controller provides feedback as to the position of the net wrapping mechanism. In some embodiments, the controller provides warning information to an operator. In some embodiments, the controller is located on the side of a harvester.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural balers, such as round balers, are well known in the agricultural industry, and the instant disclosure can be used with substantially any of such machines. Reference is made, for example, to U.S. Pat. Nos. 6,877,304; 6,688,092; 6,644,006 and 6,295,797 that illustrate such balers, the disclosures of which are incorporated herein by reference in their entirety. Embodiments of the present disclosure are particularly well suited, but in no way limited to, use with agricultural balers. The present disclosure may also find utility in agricultural harvesters including, for example, a waste baler, a cotton harvester, or a combine. In some embodiments, the present disclosure is related to embodiments disclosed in U.S. Pat. No. 9,603,308, titled "CONTINUOUS ROUND BALER WITH VARIABLE CONVEYOR", and U.S. Pat. No. 9,918,433, titled "CONTINUOUS HARVESTER AND MOBILE WRAPPING SYSTEMS AND METHODS OF USING THE SAME", filed together with the current disclosure on Jun. 26, 2014, which are incorporated herein by reference in their entirety.

The present disclosure relates to a harvester comprising: a first and a second subframe and a panel; whereby the first and second subframe define a compartment within the harvester at a first operable position; wherein the panel covers at least one interior portion of the compartment; wherein the first and second subframes are operably connected such that at least one of the first or second subframes is movable to at least a second operable position that facilitates access to at least the one interior portion of the compartment through the panel from a point exterior to the compartment. The harvester further comprises a net wrapping mechanism positioned in the compartment; wherein the first and second subframes are operably connected by at least one or a plurality or rolls that allow movement of the first and/or second subframe from the first operable position to the second operable position; wherein the second operable position is exterior to the frame; and wherein the panel facilitates access to the net wrapping device from a point exterior to the frame.

Referring to FIG. 1, a generally well-known harvester 10 is shown to include a main frame terminating forwardly in a tongue 11 and rearward slightly beyond a transverse axle 12a to which a pair of wheels 12b (only one shown) is mounted, thus forming a wheel supported main frame (not shown in detail). The main frame supports a series of belts 16 and floor rolls (not shown), which together with a first sidewall 14a (shown in the breakout) behind and generally parallel to cover panel 15 and a second sidewall 14b, collectively forming a bale-forming chamber 20. Cut crop material is picked up by transverse pickup 30 and fed into bale-forming chamber 20 where it is formed into a cylindrically shaped ball (not shown) by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2:
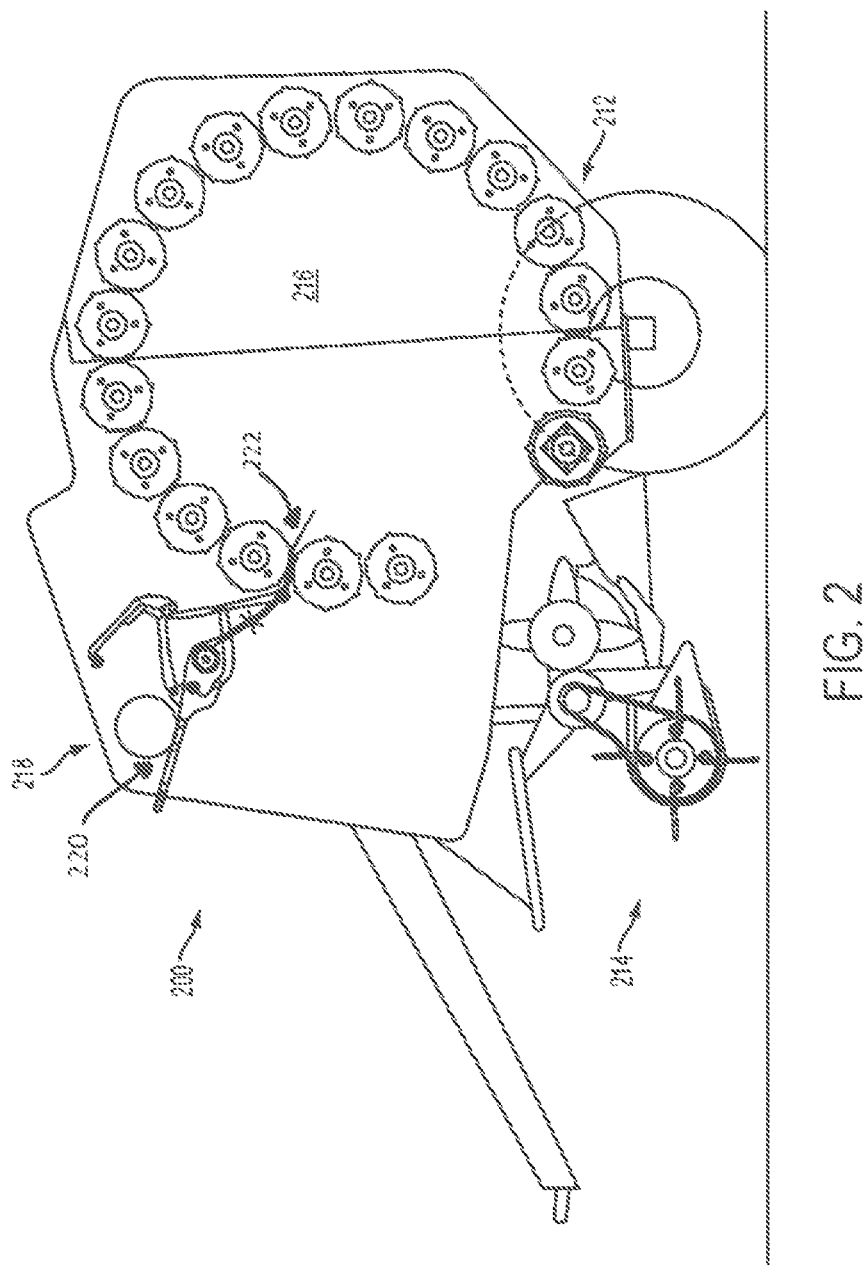
FIG. 2 depicts a cross-sectional view of a traditional fixed chamber round baler and net wrap system.

Referring to FIG. 2, a cross-sectional view of another traditional harvester 200 is shown to include as some of its main components a running gear 212, a harvested crop supply arrangement 214, a bale chamber 216, and a net wrapping arrangement 218. Net wrap material 222 is fed from a roll of net wrap material 220 into the bale chamber 216 by the net wrapping arrangement 218. In the depicted embodiment, the net wrapping arrangement 218 is located in the forward region of the harvester 200, with access to the net wrapping arrangement 218 coming from the top and/or front of the harvester.

FIGS. 3A, 3B, and 3C depict cross-sectional perspectives of embodiments of the claimed disclosure, each embodiment depicting a harvester and movable subunits in various operational positions. FIG. 3A depicts the harvester generally designated 300, comprising a frame 301 and at least one bale chamber 302. Compartment generally designated 310 is positioned within the interior of the harvester 300. The compartment 310 is operably connected to a first subframe (not shown) and a second subframe 320. In some embodiments, a net wrapping mechanism is located within the compartment 310. In some embodiments, the net wrapping mechanism is configured to wrap a bale present in the bale chamber from any one or more operable positions.

FIG. 3B depicts the compartment 310 in a position exterior to the harvester 300. The second subframe is in an extended position, with a first unit 321a attached to the interior of the harvester 300, a second unit 321c attached to first subframe (not shown), and a third unit 321b operably attached to both the first and the second units. In some embodiments, a net wrapping mechanism is located within the compartment 310. In some embodiments, the net wrapping mechanism is in a position for the replacement of wrapping material and/or maintenance. In some embodiments, the replacement of wrapping material and/or maintenance is performed by workers positioned optionally on top of the harvester and/or on a platform (not shown).

FIG. 3C depicts the compartment 310 in a position exterior to the harvester 300, but closer to the ground than the position depicted in FIG. 3B. The second subframe is depicted in an extended position, with a first, a second, and a third units 321a, 321c, and 321b in a position similar to their positions in FIG. 3B. The first subframe generally designated 330, is shown in an extended position, where it connects the compartment 310 with the second unit of the second subframe 321c. In some embodiments, a net wrapping mechanism is located within the compartment 310. In some embodiments, the net wrapping mechanism is in a position for the replacement of wrapping material and/or maintenance. In some embodiments the replacement of wrapping material and/or maintenance is performed by workers positioned on the ground and standing adjacent to or nearly adjacent to the wrapping mechanism.

Figure 4A:
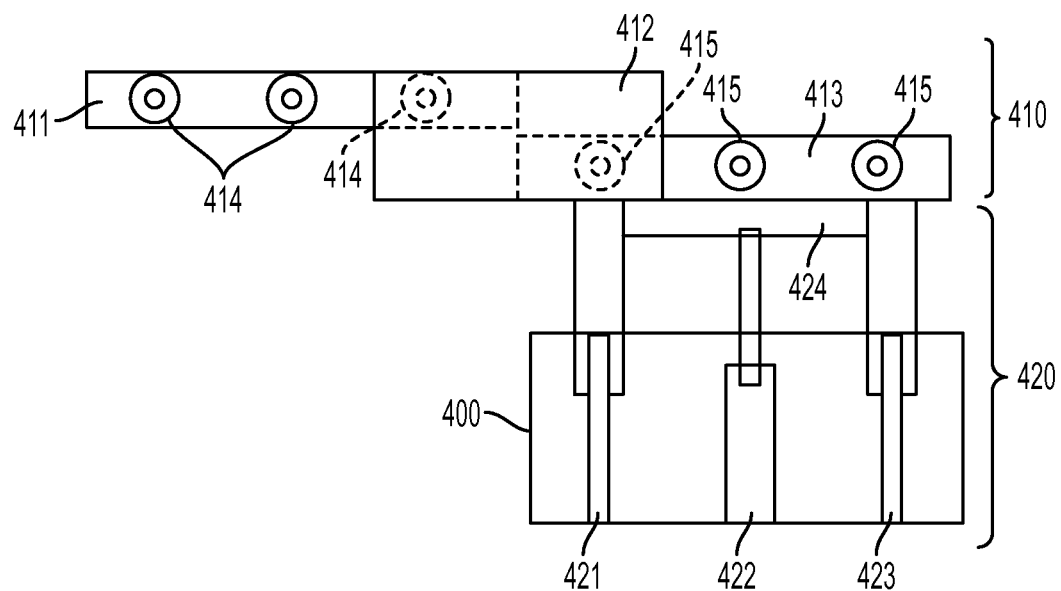
FIGS. 4A and 4B depict embodiments of the mechanism of movement of the first and second subframes.
Figure 4B:
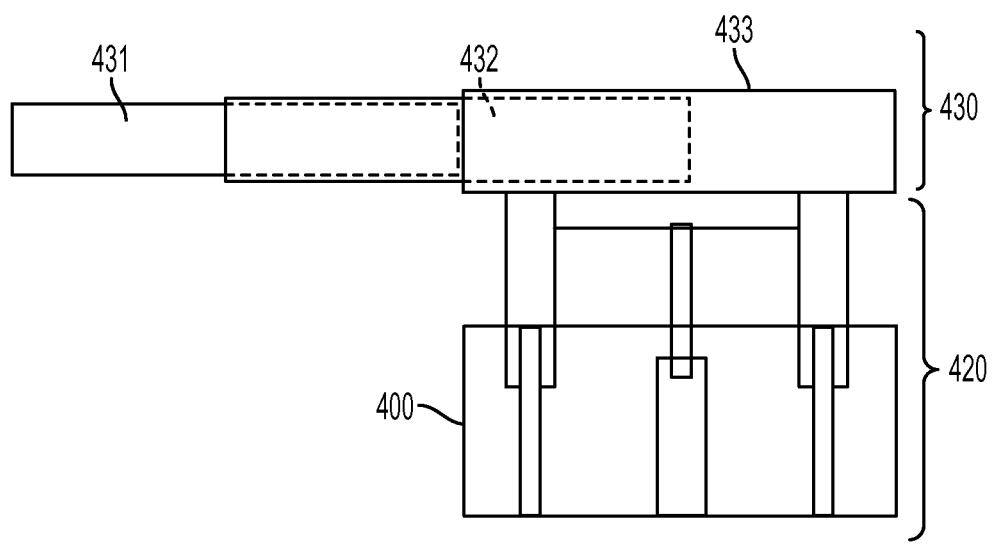

FIGS. 4A, and 4B depict the components of a cross-sectional view of a first and a second subframe in extended positions. FIG. 4A depicts a compartment 400, operably connected to a first subframe generally designated 420, that consists of a first actuator 421, a second actuator 422, a third actuator 423, and a top member 424. In some embodiments, the first subframe 420 can move vertically from an extended position to a closed position (not shown). The first subframe 420 is operably connected to a second subframe generally designated 410, that consists of three units: a first unit 411, a second unit 412, and a third unit 413. The first unit 411 is connected a first series of rollers 414. In some embodiments, the first unit 411 is connected to the interior of a harvester. The third unit 413 is connected to the first subframe 420, and a second series of rollers 415. The second unit 412 is operably connected to the first and the second series of rollers 414, and 415. In some embodiments, the second subframe 410 can move horizontally from an extended position to a closed position (not shown). In some embodiments, the first series of rollers 414 allows for a sliding motion between the first unit 411 and the second unit 412. In some embodiments, the second series of rollers 415 allows for a sliding motion between the second end unit 412 and the third unit 413. In some embodiments, the second subframe 410 can move from an extended position to a closed position (not shown) in a sliding motion.

FIG. 4B depicts a compartment 400, operably connected to a first subframe generally designated 420, which in turn is operably connected to a second subframe generally designated 430 that consists of three units: a first unit 431, a second unit 432, and a third unit 433. The first unit 431 is operably connected to the second unit 432. The third unit 433 is operably connected to the first subframe 420 and the second unit 432. In some embodiments the first unit 431 is connected to the interior of a harvester. In some embodiments, the second subframe 430 can move horizontally from an extended position to a closed position (not shown). In some embodiments, the third unit 433 has a larger internal diameter than the external diameter of the second unit 432. In some embodiments, the second unit 432 is capable of sliding into the third unit 433. In some embodiments, the second unit 432 has a larger internal diameter than the external diameter of the first unit 431. In some embodiments, the first unit 431 is capable of sliding into the second unit 432. In some embodiments, the second subframe 430 can move from an extended position to a closed position (not shown) in a sliding or telescopic motion.

Figure 5:
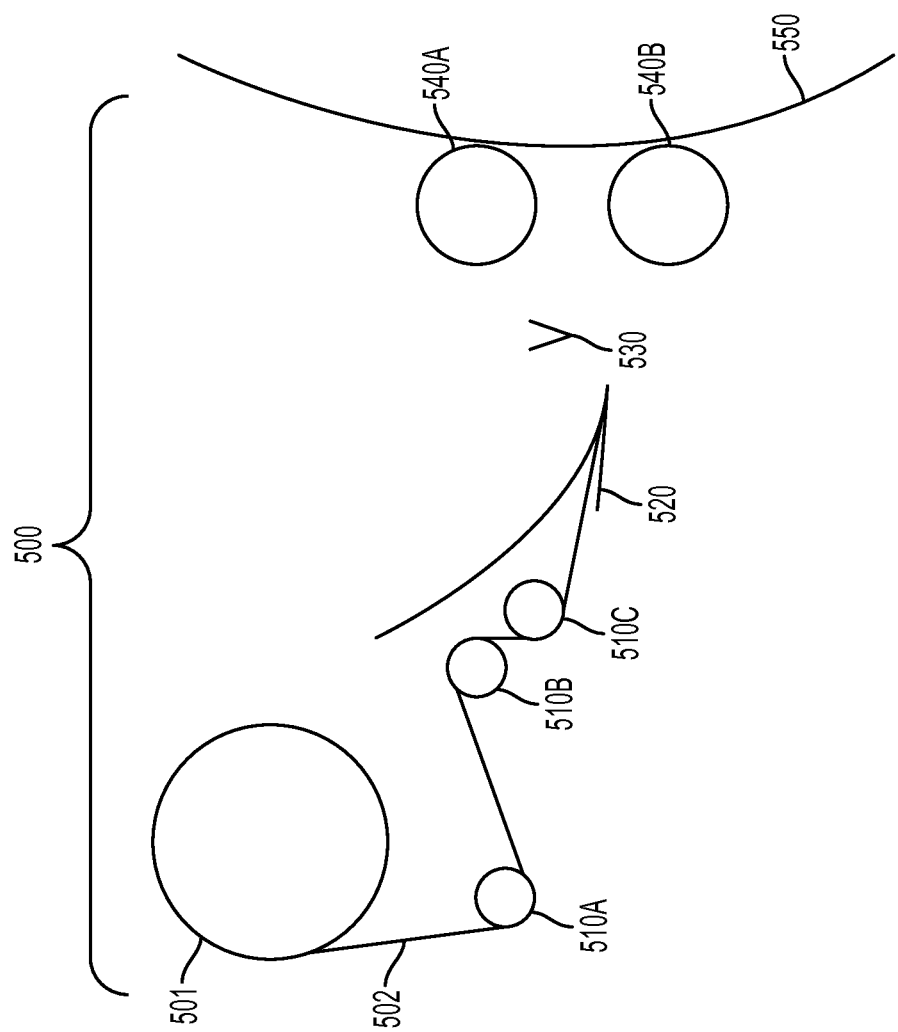
FIG. 5 depicts the elements comprising a net wrapping assembly.

FIG. 5 depicts a cross sectional view of the components of a net wrapping mechanism, generally designated 500. A wrapping material roll 501 supplies wrapping material 502 that is fed around a series of feed rollers 510a, 510b, and 510c and through a feed plate 520. A cutting knife 530 is located between the feed plate and a pair of compression rollers 540a and 540b. In some embodiments, the cutting knife 530 can cut the wrapping material. In some embodiments, the compression rollers 540a and 540b are in operably contact with a bale 550. In some embodiments, the net wrapping assembly 500 is contained within a compartment (not shown).

Figure 6B:
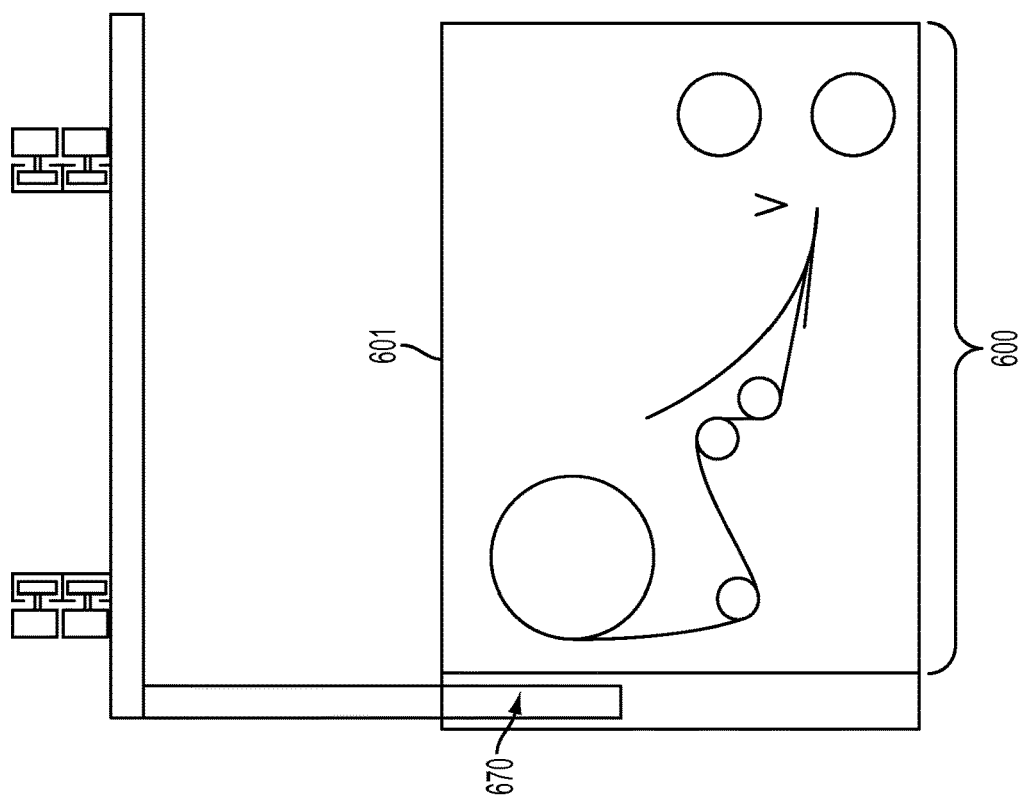
FIGS. 6A, 6B, 6C, and 6D depict embodiments of the mechanism of movement of the first and second subframes in operable connection with a net wrapping assembly.
Figure 6A:
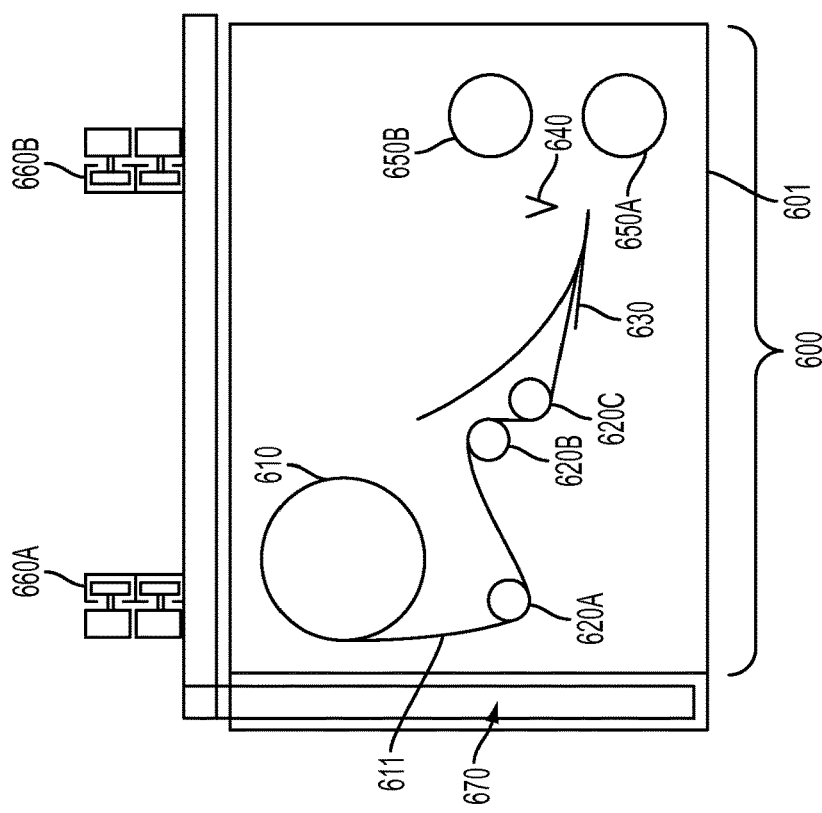
Figure 6D:
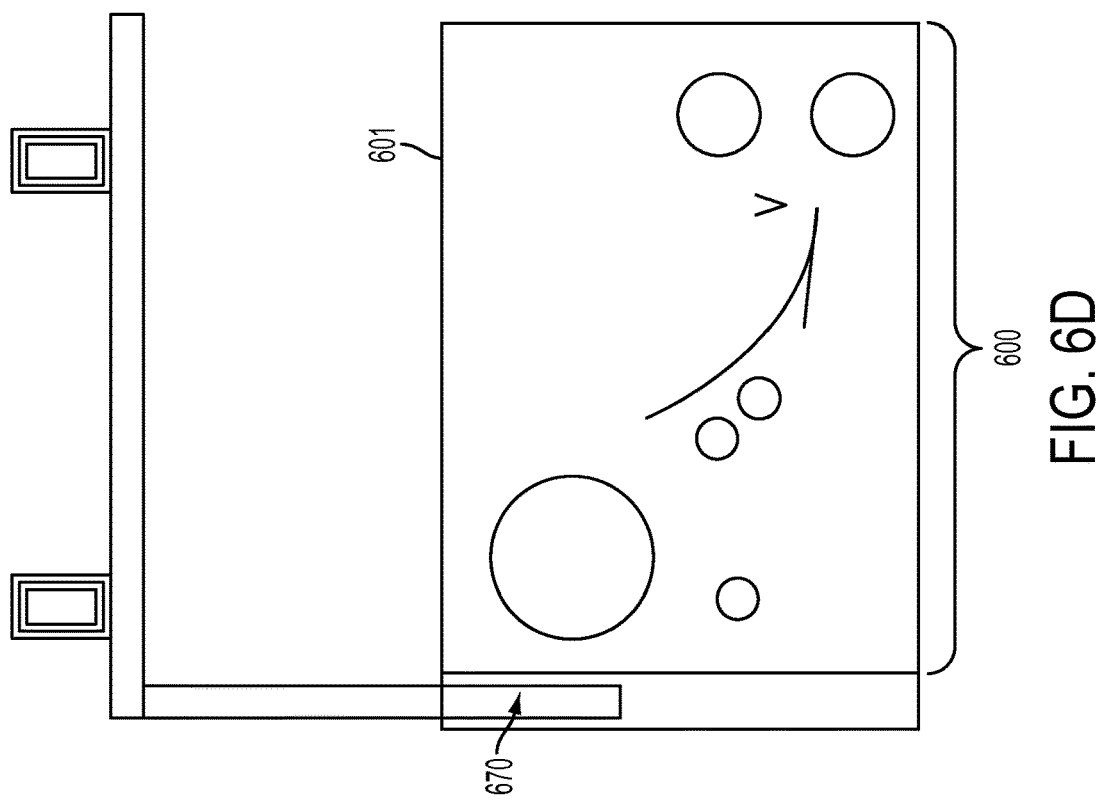
Figure 6C:
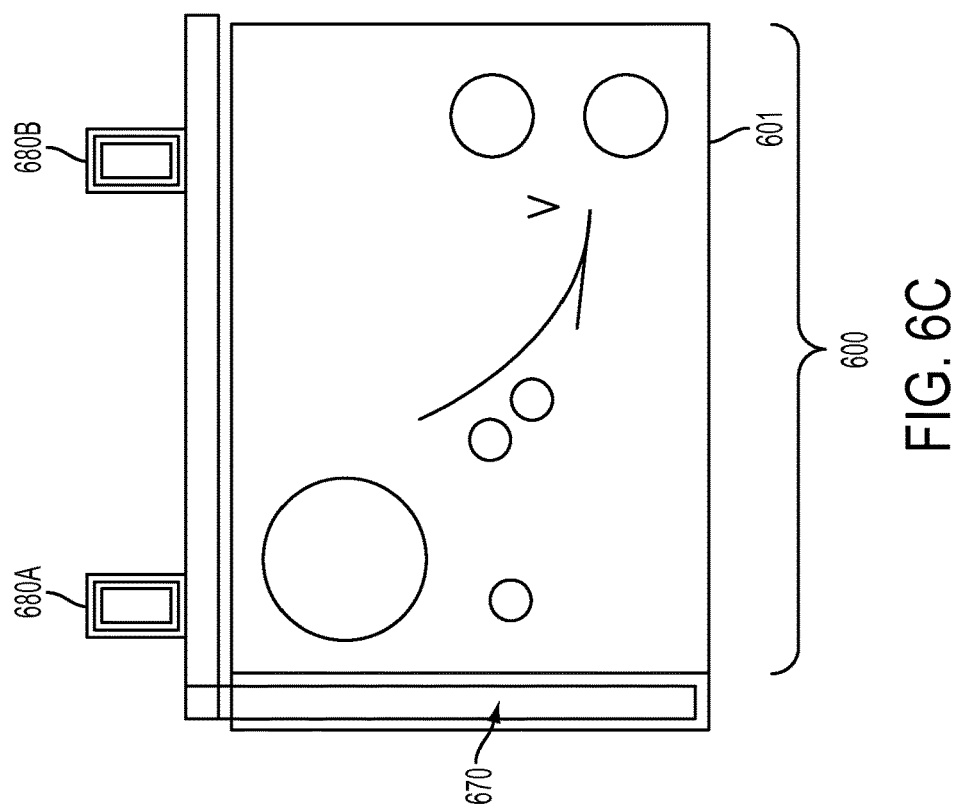

FIGS. 6A, 6B, 6C, and 6D depict the components of a cross-sectional view of a net wrapping mechanism, generally designated 600, contained within a compartment 601. The net wrapping mechanism consists of components as described in FIG. 5, including a wrapping material roll 610; wrapping material 611; a series of feed rollers 620a, 620b, and 620c; a feed plate 630; a cutting knife 640; and a pair of compression rollers 650a and 650b. FIG. 6A depicts the compartment 601 operably connected to a first subframe, generally designated 670, in a closed position. The first subframe 670 is operably connected to a second subframe consisting of a pair of sliding units utilizing rollers 660a and 660b, as described in more detail in FIG. 4A. In the depicted embodiment, the net wrapping mechanism 600 and the compartment 601 are in a raised position. FIG. 6B depicts the net wrapping mechanism 600 and the compartment 601 in a lowered position, and the first subframe 670 in an extended position. The first subframe 670 is operably connected to a second subframe consisting of a pair of sliding units utilizing rollers 660a and 660b. FIG. 6C depicts the net wrapping mechanism 600 and the compartment 601 in a raised position, and the first subframe 670 in a closed position. The first subframe 670 is operably connected to a second subframe consisting of a pair of sliding units utilizing telescopic tubes 680a and 680b, as described in more detail in FIG. 4B. FIG. 6D depicts the net wrapping mechanism 600 and the compartment 601 in a lowered position, and the first subframe 670 in an extended position. The first subframe 670 is operably connected to a second subframe consisting of a pair of sliding units utilizing telescopic tubes 680a and 680b.

Figure 7:
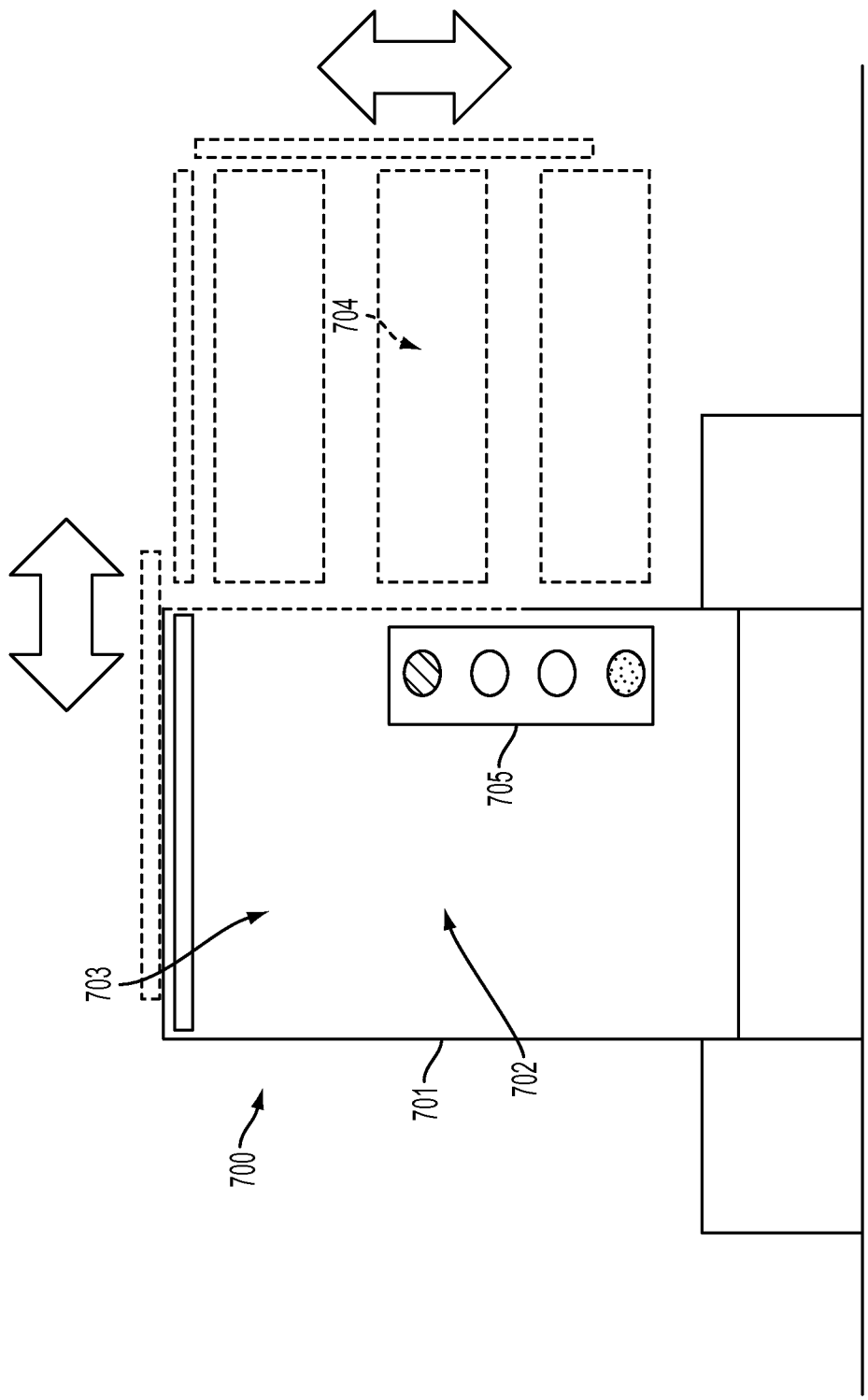
FIG. 7 depicts the harvester with various operational positions of the subframes and a controller.

FIG. 7 depicts a cross sectional view of a harvester, generally designated 700 and moveable compartment, designated 703. The harvester 700 comprises a frame 701 and at least one bale chamber 702. The moveable compartment 703 has at least a first operable position in the interior of the harvester and a plurality of operable positions on the exterior of the harvester, generally designated 704. A controller 705 is operably connected the harvester 700 and the moveable compartment 703. In some embodiments, the controller is able to control the position of the compartment in at least a first operable position in the interior of the harvester and in a plurality of operable positions on the exterior of the harvester. In some embodiments, the controller provides feedback as to the position of the compartment. In some embodiments, the controller provides feedback as to the amount of wrapping material remaining in the compartment. In some embodiments, the controller is located on the harvester frame 701. In some embodiments, the controller is located on the side of the harvester. In some embodiments, the controller can be manually activated. In some embodiments, the controller can be from the cab or operational center of the harvester. In some embodiments, the controller is operably connected to a sensor that prevents the movement of the net wrapping mechanism while the harvester is actively operating.

Figure 8:
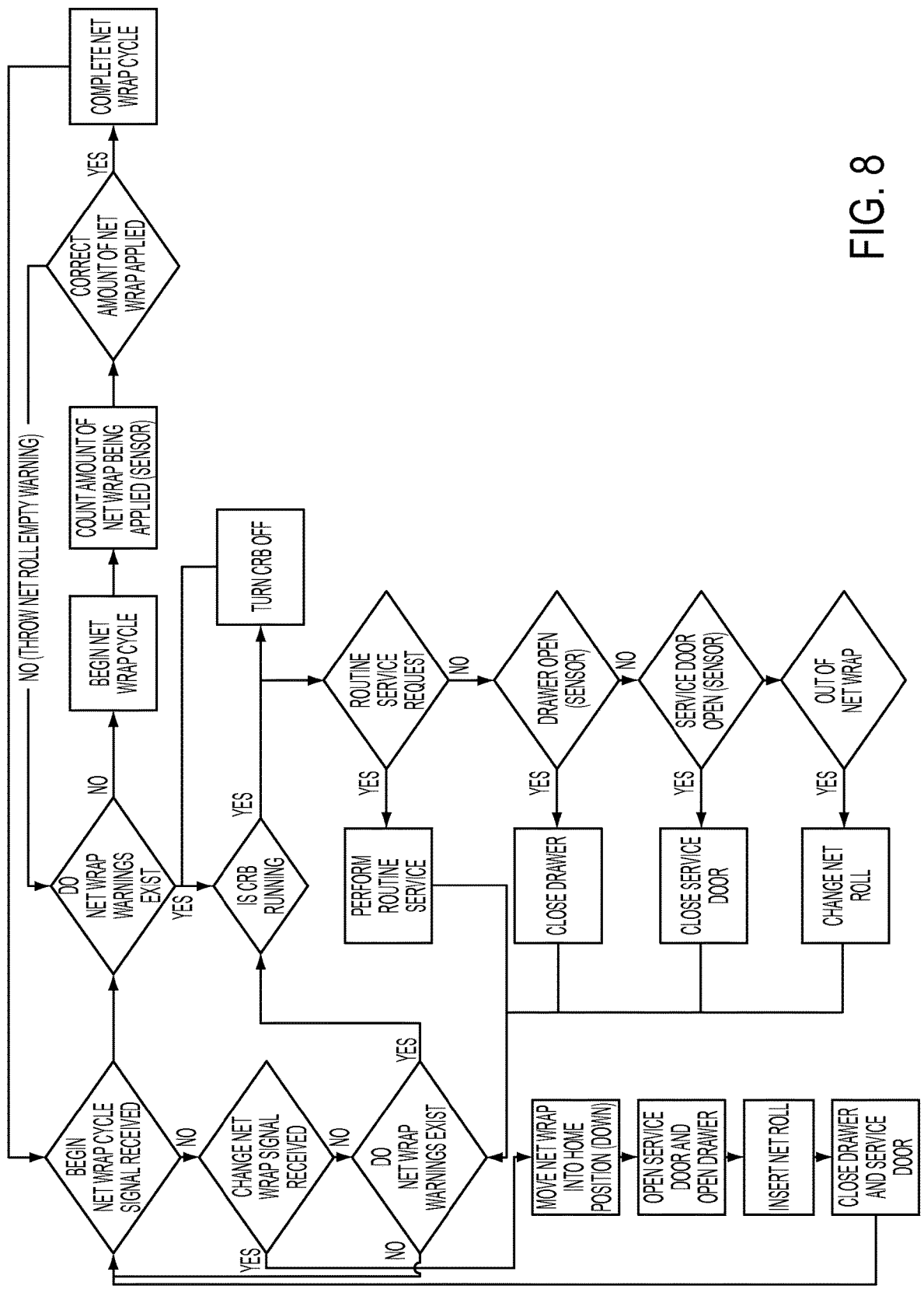
FIG. 8 depicts a schematic diagram of a control system for indicating information to an operator via a controller.

FIG. 8 depicts a schematic diagram of a control system for indicating different types of information to an operator via a controller. Such information is relayed to the control system by sensors, and may include information on the operational condition of the wrapping mechanism. In the depicted embodiment, the control system can indicate warnings when the correct amount of wrapping material is not applied, the wrapping material has run out, one or more systems or mechanisms are in need of routine service, a moveable subframe is not in a closed position, or a service panel has been left open. In some embodiments, the control system can also make sure the harvester is not currently running before the changing of wrapping material or other service. In some embodiments, the control system displays warning and other information via a controller.

In some embodiments, the systems and harvesters disclosed herein comprise at least one sensors within or proximate to at least one bale chamber.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications is incorporated by reference herein, in its entirety.

What is claimed is:

1. An agricultural harvester, comprising:
   a frame and sidewalls connected to the frame wherein at least a first bale chamber is located between the sidewalls;
   a first subframe;
   a second subframe connected to the first subframe, the second subframe comprising a first unit connected to the frame, a second unit connected to the first subframe, and a third unit operably connecting the first and second units such that the third unit is movable relative to both the first and second units;
   a net wrapping mechanism comprising a feed roller;

a compartment connected to the second unit of the second subframe and configured for holding at least a roll of net wrap material to be applied by the net wrap mechanism, wherein the compartment is located between the sidewalls in a first operable position; and a movable door configured for covering at least one interior portion of the compartment when the compartment is in the operable first position;

wherein the first and second subframes are operably connected such that at least the compartment is movable laterally to at least a second position that facilitates access to at least the one interior portion of the compartment through the movable door from a point exterior to the compartment, wherein the net wrapping mechanism is configured such that, in the first position, the net wrapping mechanism is positioned adjacent the first bale chamber and capable of dispensing wrap material in the first bale chamber; wherein the net wrapping mechanism is movable laterally relative to at least one bale forming roll forming part of the first bale chamber.

2. The harvester of claim 1, wherein:
the net wrapping mechanism is positioned in the compartment; and
the first and second subframes are connected to allow movement of the net wrap mechanism from the first operable position to the second position.

3. The harvester of claim 1, wherein the first and second subframes are operably connected by at least one or a plurality of rolls configured for adjustment of at least one of the first and second subframes from the first to at least the second position by a sliding movement of at least one of the first and second subframe.

4. The harvester of claim 1, wherein the net wrapping mechanism further comprises: a second feed roller; a feed plate; a cutting knife;
and at least a first actuator; wherein wrapping material can be passed around the feed rollers during wrapping.

5. The harvester of claim 1, wherein the at least one of the first or second subframes moves at least laterally or substantially laterally in relation to lengthwise orientation of the harvester in transition from the first to the second position; wherein the at least one of the first or second subframes is external to the frame in the second position.

6. The harvester of claim 1, wherein the at least one of the first or second subframes moves at least vertically or substantially vertically in transition from the first to the second position; and wherein the at least one of the first or second subframes is external to the frame in the second position.

7. The harvester of claim 1, wherein at least one of the first and second subframes are adjustable in one or a plurality of positions along a horizontal and/or vertical axis.

8. The harvester of claim 1, wherein:
in the first operable position, the first unit, the second unit and the third unit of the second subframe are located between the sidewalls; and
in the second position, the second unit and at least a portion of the third unit of the second subframe are disposed externally of the frame and sidewalls.

9. A net wrap assembly for wrapping agricultural crop material, comprising:
a net wrap device for applying wrap material comprising at least one roller,
a feed plate,
at least a first subframe configured for moveable connection to a frame of a harvester; and at least a second subframe connected to the at least first subframe, the second subframe comprising a first unit connected to the frame of the harvester, a second unit connected to the at least first subframe, and a third unit operably connecting the first and second units such that the third unit is movable relative to both the first and second units;
wherein the at least first subframe defines a compartment capable of movement at least between first and second positions when connected to the frame;
wherein the net wrap device is positioned within the compartment in at least the first operable position;
wherein in the operable first position, the net wrap device is adapted for dispensing net wrap material into a bale chamber of a harvester; and
wherein in the second position the net wrap device is displaced for accessibility from a point exterior to the first subframe,
wherein the net wrap device is configured such that, in the first position, the net wrap device is positioned adjacent the bale chamber and capable of dispensing wrap material in the bale chamber; wherein the net wrap device is movable laterally relative to at least one bale forming roll forming part of the bale chamber.

10. The net wrap assembly of claim 9, further comprising:
a first and second feed roller;
a first and second compression roller; and
at least one first actuator; wherein the first and second feed rollers transfer wrapping material from the net wrap device toward the feed plate.

11. The net wrap assembly of claim 9, wherein the second subframe is configured for movement when installed in a harvester between the first position within the interior of the harvester and the second maintenance position on the exterior of the harvester.

12. The net wrap assembly of claim 11, wherein the net wrap device is movable within the compartment in the first position.

13. The net wrap assembly of claim 9, further comprising a panel positioned over an opening to the compartment, wherein the net wrap assembly is adapted for use within the interior of the harvester and capable of movement from the first position to the second position by a sliding movement of the compartment from the interior of the harvester to the exterior of the harvester and wherein the panel provides access to the compartment from a point exterior to the harvester such that net wrapping material can be operably mounted on the net wrapping device.

14. The net wrap assembly of claim 9, further comprising a panel; whereby the first and second subframe define the compartment within the harvester at a first position; wherein the panel covers at least one opening to an interior portion of the compartment; wherein the first and second subframes are operably connected by at least one roll that allows movement of at least one of the first and second subframe from the first position to the second position; and wherein the position of the panel when the compartment is in the second position facilitates access to the net wrap device from a point exterior to the compartment.

15. The net wrap assembly of claim 9, further comprising a controller operably connected the net wrap assembly by at least one or a combination of: a manual lever, an electrical component, and a hydraulic actuator;
wherein the controller is capable of adjusting the position of the one or plurality of subframe upon activation, wherein the controller is operably connected to a sensor that prevents the movement of the net wrapping assembly while the harvester is actively operating.

16. A method of loading wrap material in a harvester comprising a wrap assembly, the method comprising:

(a) adjusting the position of a compartment configured for supporting a wrap material roll for supplying wrapping material to wrap feeding rolls, the compartment defined by sides of at least a first subframe, wherein adjusting the position of the compartment comprises manually moving or electronically initiating a command that displaces at least a portion of the compartment supporting the material roll laterally from a first position in the interior of the harvester adjacent to a bale forming chamber to a second loading position external to a frame of the harvester;

wherein in the second position of the compartment a door is positioned to facilitate access to the compartment from a point exterior to the harvester;

wherein the wrap assembly comprising a second subframe, the second subframe comprising a first unit connected to a frame of a harvester, a second unit connected to the first subframe, and a third unit operably connecting the first and second units such that the third unit is movable relative to both the first and second units, the step of adjusting the position of the compartment comprising manually moving or electronically initiating a command that displaces the third unit relative to the first and second units to laterally move the portion of the compartment from the first position to the second loading position;

wherein the wrap assembly is configured such that, in the first position, the wrap assembly is positioned adjacent the bale chamber and capable of dispensing wrap material in the bale chamber; wherein the wrap assembly is movable laterally relative to at least one bale forming roll forming part of the bale chamber.

17. The method of claim 16, wherein the method further comprises a step of removing a used wrap roll from the wrap assembly after step (a); and inserting a second wrap roll and a step of moving the compartment with the second wrap roll back within the frame of the harvester.

18. The method of claim 16, wherein a wrapping device is located within the compartment, the wrapping device comprising the wrap material roll, the wrap feeding rolls and a wrap feed plate.

* * * * *